(12) United States Patent
Liu et al.

(10) Patent No.: US 11,086,306 B1
(45) Date of Patent: Aug. 10, 2021

(54) GENERALIZATION AND ENCAPSULATION METHOD AND SYSTEM BASED ON DIGITAL TWIN MODEL OF WORKSHOP

(71) Applicant: GUANGDONG UNIVERSITY OF TECHNOLOGY, Guangzhou (CN)

(72) Inventors: Qiang Liu, Guangzhou (CN); Duxi Yan, Guangzhou (CN); Xin Chen, Guangzhou (CN); Jiewu Leng, Guangzhou (CN); Ding Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/155,012

(22) Filed: Jan. 21, 2021

Related U.S. Application Data

(63) Continuation of application No. PCT/CN2020/142188, filed on Dec. 31, 2020.

(30) Foreign Application Priority Data

Mar. 12, 2020 (CN) .......................... 202010172579.5

(51) Int. Cl.
*G05B 19/418* (2006.01)
(52) U.S. Cl.
CPC ... *G05B 19/41885* (2013.01); *G05B 19/4189* (2013.01); *G05B 2219/35499* (2013.01)
(58) Field of Classification Search
None
See application file for complete search history.

(56) References Cited

U.S. PATENT DOCUMENTS 5,453,933 A * 9/1995 Wright ................. G05B 19/414
700/181
8,935,167 B2 1/2015 Bellegarda
(Continued)

FOREIGN PATENT DOCUMENTS

| CN | 107832497 A | 3/2018 |
|---|---|---|
| CN | 108629138 A | 10/2018 |

(Continued)

*Primary Examiner* — Carlos R Ortiz Rodriguez
(74) *Attorney, Agent, or Firm* — True Shepherd LLC; Andrew C. Cheng

(57) ABSTRACT

A generalization and encapsulation method based on a digital twin (DT) model of a workshop includes: classifying a device in a production line according to a basic operation and a functional characteristic of a process of the device; abstracting a commonality in terms of process action mode, process algorithm and action trigger mechanism; encapsulating according to a sequence characteristic of a process; comparing processes, and generalizing and encapsulating; encapsulating according to a time sequence, a space sequence and a logic characteristic of a specific process; storing a generalized and encapsulated process in a database; and calling the generalized and encapsulated process from the database to a device or a process. The generalization and encapsulation system includes an abstract process encapsulation module, a continuous process encapsulation module, a process action encapsulation module, a process algorithm encapsulation module, a database and a fast calling module.

6 Claims, 1 Drawing Sheet

(56) References Cited

U.S. PATENT DOCUMENTS

| | | | |
|---|---|---|---|
| 9,582,608 B2 | 2/2017 | Bellegarda | |
| 10,607,141 B2 | 3/2020 | Jerram et al. | |
| 2019/0340715 A1 | 11/2019 | Cella | |

FOREIGN PATENT DOCUMENTS

| | | | |
|---|---|---|---|
| CN | 109116751 A | 1/2019 | |
| CN | 110020484 A | 7/2019 | |
| CN | 110222450 A | 9/2019 | |
| CN | 110276147 A | 9/2019 | |

\* cited by examiner

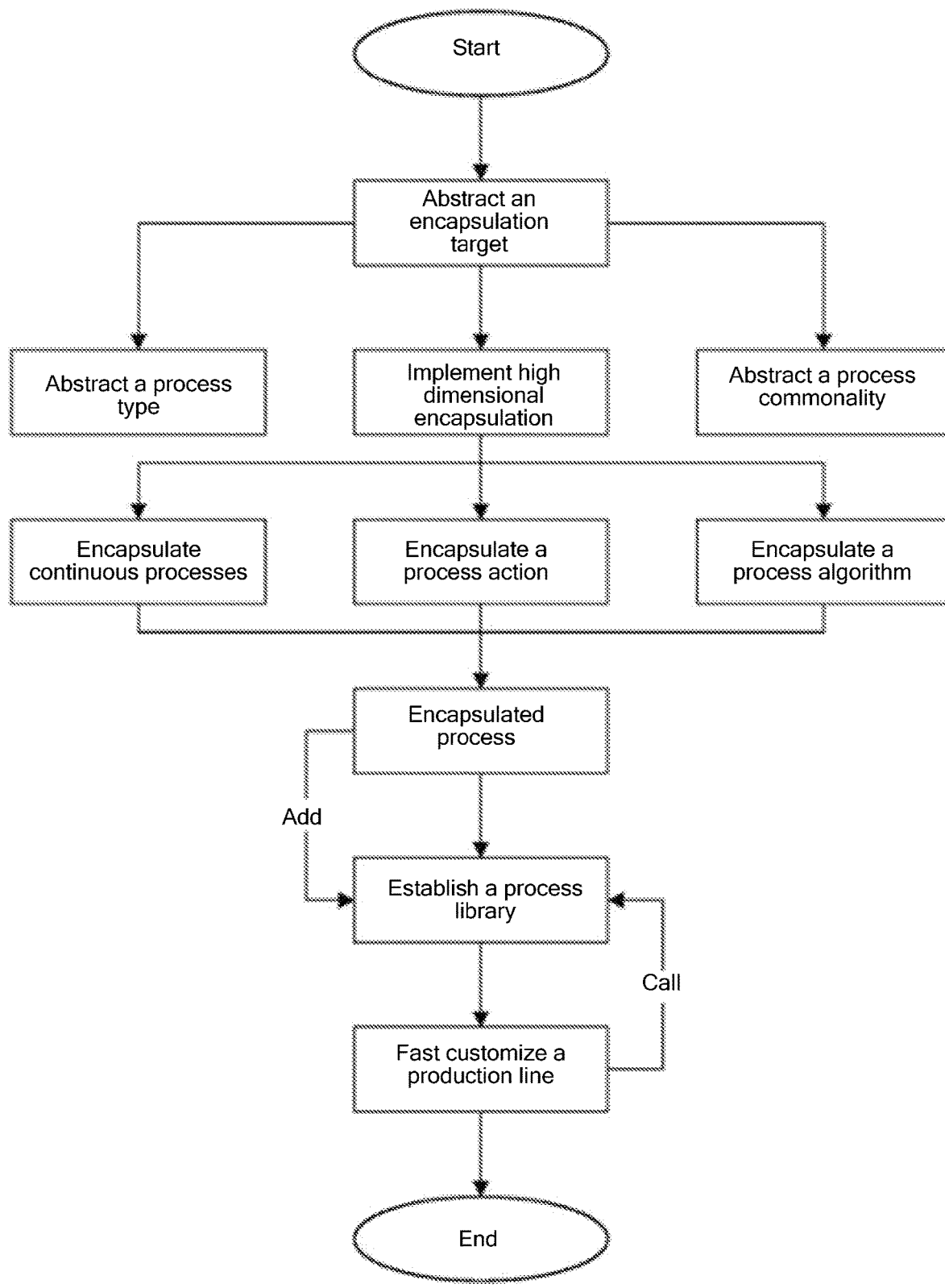

GENERALIZATION AND ENCAPSULATION METHOD AND SYSTEM BASED ON DIGITAL TWIN MODEL OF WORKSHOP

CROSS-REFERENCE TO RELATED APPLICATIONS

This application is a continuation of International Patent Application No. PCT/CN2020/142188 with a filing date of Dec. 31, 2020, designating the United States, now pending, and further claims priority to Chinese Patent Application No. 202010172579.5 with a filing date of Mar. 12, 2020. The content of the aforementioned applications, including any intervening amendments thereto, are incorporated herein by reference.

TECHNICAL FIELD

The present disclosure relates to the technical field of industrial automation, in particular to a generalization and encapsulation method and system based on a digital twin (DT) model of a workshop.

BACKGROUND

The existing technologies focus on workshop modeling and configuration design. They tend to build configuration space on a modularized basis, construct an individualized design plan by combining inference, optimization and other techniques and supplement with off-line simulation and analysis. They are closer to static design and have the following shortcomings. (1) The design plan constructed by the existing design methods does not incorporate multiple processes, so a large amount of repeated modeling and algorithmic operations are required to establish a digital model operating system for a similar production line, which reduces work efficiency. (2) The large amount of repeated operations will make the engineer fatigued, significantly increasing the possibility of errors in the model or algorithm, and will waste a lot of time and even delay the construction period. (3) The existing custom design procedure of the workshop serializes workshop layout, device integration, control system research and development and management system development. The serialization will lead to an excessively long design cycle; in particular, major changes in a previous stage will directly lead to the re-design of a subsequent stage, resulting in a high change cost and long cycle.

SUMMARY

An objective of the present disclosure is to propose a generalization and encapsulation method based on a digital twin (DT) model of a workshop. The generalization and encapsulation method optimizes a modeling procedure, facilitates the modeling of an encapsulated process, reduces the error rate of modeling, and improves modeling efficiency.

The present disclosure further proposes a generalization and encapsulation system based on a DT model of a workshop. The generalization and encapsulation system includes an abstract process encapsulation module, a continuous process encapsulation module, a process action encapsulation module, a process algorithm encapsulation module, a database and a fast calling module.

To achieve the above purpose, the present disclosure provides the following technical solutions.

A generalization and encapsulation method based on a DT model of a workshop includes the following steps:

(1) classifying a device in a production line according to a basic operation and a functional characteristic of a process of the device;

(2) abstracting a commonality in terms of process action mode, process algorithm and action trigger mechanism in the production line, and generalizing and encapsulating a process based on the commonality;

(3) encapsulating a continuous process flow that meets a condition by considering a layout of devices in the production line according to a sequence characteristic of the process flow;

(4) comparing processes that are the same and/or similar, analyzing an action of the device in the process, and generalizing and encapsulating the process action and a corresponding process;

(5) encapsulating an applied algorithm and the corresponding process according to a time sequence, a space sequence and a logic characteristic of the specific process;

(6) storing the generalized and encapsulated process in a database of simulation modeling software; and (7) calling the generalized and encapsulated process from the database to a device or a process according to a need of a customized production line.

Further, in step (1), a process is classified as cutting, drilling, shearing, installation, heat treatment, electrochemical or testing according to a basic operation and a functional characteristic of the process.

Further, in step (1), a process similar to laser cutting, tool cutting and water jet cutting is classified as cutting;

a process similar to drilling, boring or tapping is classified as drilling;

a process similar to stamping or punching is classified as shearing;

a process similar to fitting, buckling, pressing or screw locking is classified as installation;

a process similar to normalizing, annealing, quenching, tempering or electric hot air heating is classified as heat treatment;

a process similar to electroplating or electrochemical etching is classified as electrochemical; and product testing is classified as testing.

Further, in step (3), two or more continuous processes are generalized and encapsulated.

Further, in step (4), the process action includes a preparation action, a processing action and a finishing action.

Further, in step (6), the simulation modeling software is Demo3D.

Further, in steps (1) to (7), during encapsulation, an editable setting parameter is reserved for setting and modification when the encapsulated process is called subsequently.

A generalization and encapsulation system based on a DT model of a workshop includes an abstract process encapsulation module, a continuous process encapsulation module, a process action encapsulation module, a process algorithm encapsulation module, a database and a fast calling module, where the abstract process encapsulation module is used for classifying a process according to a basic operation and a functional characteristic of the process, and abstracting a commonality in terms of process action mode, process algorithm and action trigger mechanism;

the continuous process encapsulation module is used for encapsulating a continuous process flow that meets a condition by considering a layout of devices in a production line according to a sequence characteristic of the process flow;

the process action encapsulation module is used for comparing processes that are the same and/or similar, analyzing an action of a workpiece in the process, and generalizing and encapsulating the process action and a corresponding process;

the process algorithm encapsulation module is used for encapsulating an applied algorithm and the corresponding process according to a time sequence, a space sequence and a logic characteristic of the specific process;

the database is used for storing the generalized and encapsulated process;

the fast calling module is used for calling the generalized and encapsulated process fast from the database to a device or a process according to a need of a customized production line.

Further, the abstract process encapsulation module classifies a process as cutting, drilling, shearing, installation, heat treatment, electrochemical or testing according to a basic operation and a functional characteristic of the process.

The present disclosure has the following beneficial effects:

The present disclosure optimizes a modeling procedure, facilitates the modeling of an encapsulated process, reduces the error rate of modeling, improves modeling efficiency, effectively reduces repetition of workshop work, and increases the fault tolerance of later workshop changes.

BRIEF DESCRIPTION OF THE DRAWINGS

FIG. 1 is a flowchart of a generalization and encapsulation method.

DETAILED DESCRIPTION

The technical solutions of the present disclosure are described in more detail below with reference to the accompanying drawings and specific implementations.

The present disclosure is based on premises including:

(1) Three-dimensional (3D) digital modeling of a device is completed, and a digital model of a stand-alone device is established. The digital model is a general 3D computer-aided design (CAD) model with a clear product structure, and moving parts of the stand-alone device can be independently expressed and marked.

(2) There is an open platform, which is capable of 3D virtual design, carrying out virtual configuration of a stand-alone device, controlling actions of a device or one in production through a script, and has a function of Soft PLC.

(3) There is an upper-level manufacturing execution system (MES) system or an execution engine thereof.

A generalization and encapsulation method based on a digital twin (DT) model of a workshop includes the following steps:

(1) Classify a device in a production line according to a basic operation and a functional characteristic of a process of the device.

The basic operation of the device corresponds to a processing type in the production line, such as cutting, drilling, shearing, installation, heat treatment, electrochemical or testing. After being classified by the basic operation, the device may be further classified according to a functional characteristic thereof. For example, a device of cutting type may be classified as laser cutting, tool cutting or water jet cutting according to a function thereof.

The overall classification of processes facilitates subsequent generalization and encapsulation.

(2) Abstract a commonality in terms of process action mode, process algorithm and action trigger mechanism in the production line, and generalize and encapsulate a process based on the commonality.

Generally, after the classification in step (1), devices in each category have a similar property in terms of process action mode, process algorithm and action trigger mechanism. Step (2) is to abstract the commonality of the devices, and generalize and encapsulate a process based on the commonality. For example, laser cutting and water jet cutting processes have a commonality in terms of action mode, action algorithm and action trigger (i.e. when to trigger cutting), and can be generalized and encapsulated according to the commonality. Abstraction is to strip useful information from the actual process, such as the action of a workpiece or a component, or a basic structure of a device, and to discard information that is useless for describing a process characteristic, such as a layout of wires or air pipes.

(3) Encapsulate a continuous process flow that meets a condition by considering a layout of devices in the production line according to a sequence characteristic of the process flow.

Generally, the devices in the production line are arranged in a processing sequence. At some step of processing, a single processing device or multiple processing devices may be required to process simultaneously or sequentially. Step (3) is to encapsulate a continuous process flow according to the sequence of the devices and the layout of the production line. For example, in the process flow of a mobile phone assembly line, the dispensing and pressing of a touch panel (TP) usually occur continuously, so two or more similar continuous processes may be generalized and encapsulated.

(4) Compare processes that are the same and/or similar, analyze an action of the device in the process, and generalize and encapsulate the process action and a corresponding process.

If devices in the same category of devices and/or processes have a similar process action, the process action and the corresponding process are generalized and encapsulated to facilitate a subsequent call. If the preparation action, processing action or finishing action of a device is the same in the same category of processes, the process action and the corresponding process are generalized and encapsulated.

(5) Encapsulate an applied algorithm and the corresponding process according to a time sequence, a space sequence and a logic characteristic of the specific process.

For example, for different TP production lines, the two processes of dispensing and pressing are generally carried out successively, which means that the time sequence of the two processes is fixed. In addition, in most cases, the spatial sequence of the two processes is also fixed, that is, the two production devices for the two processes are installed next to each other. Therefore, the action algorithm and spatial algorithm of the two processes may be encapsulated together to achieve the purpose of overall call.

For example, different types of lathes have actions such as loading and clamping, workpiece rotation and tool feeding. Even if the specific posture of the workpiece is different (axis being horizontal or vertical), the logic is consistent, that is, loading and clamping. Therefore, the logic and the process method may be generalized and encapsulated to achieve the purpose of overall call.

(6) Store the generalized and encapsulated process in a database of simulation modeling software.

(7) Call the generalized and encapsulated process from the database to a device or a process according to a need of a customized production line.

When designing 3D DT models of different production lines, a user may fast call a required encapsulated process, and adjust a parameter and a script of the encapsulated process according to an actual need. In this way, the design procedure of the production line of a similar product is simplified, and repeated design of the same or similar process is avoided, thereby shortening the design cycle.

The present disclosure optimizes a modeling procedure, facilitates the modeling of an encapsulated process, reduces the error rate of modeling, improves modeling efficiency, effectively reduces repetition of workshop work, and increases the fault tolerance of later workshop changes.

The present disclosure is suited for generalization and encapsulation of intermediate devices and all processing devices and processes on the production line. The technical solution optimizes a modeling procedure, facilitates the modeling of an encapsulated process, reduces the error rate of modeling, and improves modeling efficiency.

Further, in step (1), a process is classified as cutting, drilling, shearing, installation, heat treatment, electrochemical or testing according to a basic operation and a functional characteristic of the process.

Further, in step (1), a process similar to laser cutting, tool cutting and water jet cutting is classified as cutting;

a process similar to drilling, boring or tapping is classified as drilling;

a process similar to stamping or punching is classified as shearing;

a process similar to fitting, buckling, pressing or screw locking is classified as installation;

a process similar to normalizing, annealing, quenching, tempering or electric hot air heating is classified as heat treatment;

a process similar to electroplating or electrochemical etching is classified as electrochemical;

product testing is classified as testing.

Further, in step (3), two or more continuous processes are generalized and encapsulated.

Further, in step (4), the process action includes a preparation action, a processing action and a finishing action.

Further, in step (6), the simulation modeling software is Demo3D.

Further, in steps (1) to (7), during encapsulation, an editable setting parameter is reserved for setting and modification when the encapsulated process is called subsequently.

Through steps (1) to (7), preliminary design optimization is completed. It is preferable to reserve an editable setting parameter during encapsulation, so that the setting parameter may be directly adjusted in a later operation period, which simplifies research and development, avoids repeated design of the same or similar process, and shortens the design cycle.

A generalization and encapsulation system based on a DT model of a workshop includes an abstract process encapsulation module, a continuous process encapsulation module, a process action encapsulation module, a process algorithm encapsulation module, a database and a fast calling module.

The abstract process encapsulation module is used for classifying a process according to a basic operation and a functional characteristic of the process, and abstracting a commonality in terms of process action mode, process algorithm and action trigger mechanism.

The continuous process encapsulation module is used for encapsulating a continuous process flow that meets a condition by considering a layout of devices in a production line according to a sequence characteristic of the process flow.

The process action encapsulation module is used for comparing processes that are the same and/or similar, analyzing an action of a workpiece in the process, and generalizing and encapsulating the process action and a corresponding process.

The process algorithm encapsulation module is used for encapsulating an applied algorithm and the corresponding process according to a time sequence, a space sequence and a logic characteristic of the specific process.

The database is used for storing the generalized and encapsulated process.

The fast calling module is used for calling the generalized and encapsulated process fast from the database to a device or a process according to a need of a customized production line.

Further, the abstract process encapsulation module classifies a process as cutting, drilling, shearing, installation, heat treatment, electrochemical or testing according to a basic operation and a functional characteristic of the process.

The technical principles of the present disclosure are described above with reference to the specific embodiments. These descriptions are merely intended to explain the principles of the present disclosure, and may not be construed as limiting the protection scope of the present disclosure in any way. Therefore, those skilled in the art may derive other specific implementations of the present disclosure without creative effort, but these implementations should fall within the protection scope of the present disclosure.

What is claimed is:

1. A generalization and encapsulation method based on a digital twin (DT) model of a workshop that includes a production line including multiple stand-alone devices each of which has a pre-established digital model configurable in an open platform, the method comprising the following steps:
   (1) classifying a device in a production line according to a basic operation and a functional characteristic of a process of the device;
   (2) abstracting a commonality in terms of process action mode, process algorithm and action trigger mechanism in the production line, and generalizing and encapsulating a process based on the commonality;
   (3) encapsulating a continuous process flow that meets a condition by considering a layout of devices in the production line according to a sequence characteristic of the process flow;
   (4) comparing processes that are the same and/or similar, analyzing an action of the device in the process, and generalizing and encapsulating the process action and a corresponding process;
   (5) encapsulating an applied algorithm and the corresponding process according to a time sequence, a space sequence and a logic characteristic of the specific process;
   (6) storing the generalized and encapsulated process in a database of simulation modeling software; and
   (7) calling the generalized and encapsulated process from the database to a device or a process according to a need of a customized production line,
   wherein in step (1), a process is classified as one of cutting, drilling, shearing, installation, heat treatment, electrochemical, and testing according to a basic operation and a functional characteristic of the process, and wherein in step (3), two or more continuous processes are generalized and encapsulated.

2. The generalization and encapsulation method based on a DT model of a workshop according to claim 1, wherein in step (1), a process similar to laser cutting, tool cutting and water jet cutting is classified as cutting;
 a process similar to drilling, boring or tapping is classified as drilling;
 a process similar to stamping or punching is classified as shearing;
 a process similar to fitting, buckling, pressing or screw locking is classified as installation;
 a process similar to normalizing, annealing, quenching, tempering or electric hot air heating is classified as heat treatment;
 a process similar to electroplating or electrochemical etching is classified as electrochemical; and
 product testing is classified as testing.

3. The generalization and encapsulation method based on a DT model of a workshop according to claim 1, wherein in step (4), the process action comprises a preparation action, a processing action and a finishing action.

4. The generalization and encapsulation method based on a DT model of a workshop according to claim 1, wherein in step (6), the simulation modeling software is Demo3D.

5. The generalization and encapsulation method based on a DT model of a workshop according to claim 1, wherein in steps (1) to (7), during encapsulation, an editable setting parameter is reserved for setting and modification when the encapsulated process is called subsequently.

6. A generalization and encapsulation system based on a DT model of a workshop that includes a production line including multiple stand-alone devices each of which has a pre-established digital model configurable in an open platform, the system comprising an abstract process encapsulation module, a continuous process encapsulation module, a process action encapsulation module, a process algorithm encapsulation module, a database and a fast calling module, wherein
 the abstract process encapsulation module is used for classifying a process according to a basic operation and a functional characteristic of the process, and abstracting a commonality in terms of process action mode, process algorithm and action trigger mechanism;
 the continuous process encapsulation module is used for encapsulating a continuous process flow that meets a condition by considering a layout of devices in a production line according to a sequence characteristic of the process flow;
 the process action encapsulation module is used for comparing processes that are the same and/or similar, analyzing an action of a workpiece in the process, and generalizing and encapsulating the process action and a corresponding process;
 the process algorithm encapsulation module is used for encapsulating an applied algorithm and the corresponding process according to a time sequence, a space sequence and a logic characteristic of the specific process;
 the database is used for storing the generalized and encapsulated process;
 the fast calling module is used for calling the generalized and encapsulated process fast from the database to a device or a process according to a need of a customized production line,
 wherein the abstract process encapsulation module classifies a process as cutting, drilling, shearing, installation, heat treatment, electrochemical or testing according to a basic operation and a functional characteristic of the process; and
 wherein the continuous process encapsulation module encapsulates two or more continuous process.

* * * * *